US012785221B2

(12) United States Patent
Lai et al.

(10) Patent No.: US 12,785,221 B2
(45) Date of Patent: Nov. 3, 2026

(54) CURRENT COLLECTOR COMPONENT AND SECONDARY BATTERY

(71) Applicant: JIANGSU ZENERGY BATTERY TECHNOLOGIES CO., LTD., Jiangsu (CN)

(72) Inventors: Lincong Lai, Jiangsu (CN); Hongjiang Yu, Jiangsu (CN); Rui Wang, Jiangsu (CN); Pan Xu, Jiangsu (CN); Zhimin Xue, Jiangsu (CN); Zhigao Luo, Jiangsu (CN); Yongjun Li, Jiangsu (CN)

(73) Assignee: JIANGSU ZENERGY BATTERY TECHNOLOGIES GROUP CO., LTD., Changshu Suzhou (CN)

( * ) Notice: Subject to any disclaimer, the term of this patent is extended or adjusted under 35 U.S.C. 154(b) by 575 days.

(21) Appl. No.: 18/370,597

(22) Filed: Sep. 20, 2023

(65) Prior Publication Data

US 2024/0097286 A1 Mar. 21, 2024

(30) Foreign Application Priority Data

Sep. 20, 2022 (CN) ......................... 202222487499.6

(51) Int. Cl.
*H01M 50/536* (2021.01)
*H01M 4/70* (2006.01)

(52) U.S. Cl.
CPC ........... *H01M 50/536* (2021.01); *H01M 4/70* (2013.01)

(58) Field of Classification Search
CPC ...... H01M 50/536; H01M 4/70; H01M 50/15; H01M 50/176; H01M 50/531; H01M 50/533; H01M 50/538; H01M 50/55; H01M 50/553; H01M 50/593; H01M 10/0422; Y02E 60/10
See application file for complete search history.

(56) References Cited

U.S. PATENT DOCUMENTS

| | | | | |
|---|---|---|---|---|
| 5,389,458 A * | 2/1995 | Weiss .................... | H01M 10/48 324/427 |
| 2023/0033282 A1* | 2/2023 | Su ........................ | H01M 50/213 |
| 2023/0253649 A1* | 8/2023 | Min ..................... | H01M 50/143 429/163 |

FOREIGN PATENT DOCUMENTS

| | | | |
|---|---|---|---|
| CN | 216389437 | * | 4/2022 |
| JP | 2000090912 | * | 3/2000 |

* cited by examiner

*Primary Examiner* — Lisa S Park
(74) *Attorney, Agent, or Firm* — The Sun IP Law

(57) ABSTRACT

The disclosure belongs to the technical field of batteries, and particularly relates to a current collector component, which includes a first current collector piece, a second current collector piece, and an insulator, the first current collector piece and the second current collector piece being in insulated connection through an insulator; the second current collector piece includes a body part and a welding part, the body part and the welding part forming an included angle, and a welding surface of the welding part and a surface of the body part forming an included angle. The structure of the disclosure has high welding safety, may increase the utilization rate of the internal space of a housing, and may prevent the damage to a cell caused by laser penetration welding. In addition, the disclosure further discloses a secondary battery.

18 Claims, 5 Drawing Sheets

CURRENT COLLECTOR COMPONENT AND SECONDARY BATTERY

TECHNICAL FIELD

The disclosure belongs to the technical field of batteries, and particularly relates to a current collector component and a secondary battery.

BACKGROUND

Lithium-ion batteries have the advantages of light weight, high capacity, long life, low self-discharge rate, no memory effect, and no pollution. With the development of modern society, the increasing awareness of environmental protection, and the growing new energy industry, more and more devices choose the lithium-ion batteries as power sources, such as mobile phones, laptop computers, electric tools, and electric vehicles, which provides a broad space for the application and development of the lithium-ion batteries.

Existing cylindrical batteries are welded by direct laser penetration welding from a cover plate to a current collector piece. Because a cell is located below the current collector piece, the laser is prone to continue to penetrate after penetrating through the current collector piece, thereby causing the damage to the cell.

SUMMARY

An objective of the disclosure is, in view of the shortcomings of the related art, to provide a current collector component to improve the welding safety, which not only increases the utilization rate of the internal space of a housing, but also prevents the damage to the cell caused by laser penetration welding.

In order to achieve the above objective, the disclosure adopts the following technical solutions.

A current collector component includes a first current collector piece, a second current collector piece, and an insulator.

The first current collector piece and the second current collector piece are in insulated connection through the insulator.

The second current collector piece includes a body part and a welding part, the body part and the welding part forming an included angle.

In an embodiment, a connection of the body part and the welding part is provided with a notch.

In an embodiment, the welding part is vertically arranged on the body part.

In an embodiment, the insulator is provided with a clamping part, and an edge of the body part is clamped to the clamping part.

In an embodiment, the first current collector piece includes a main body part, the insulator being provided with a first assembly through hole and a second assembly through hole, the main body part being arranged in the first assembly through hole, and the body part being arranged in the second assembly through hole.

In an embodiment, the insulator is provided with an avoidance area at the second assembly through hole to avoid the welding part.

In an embodiment, the first current collector piece further includes a boss part, the insulator being provided with a first avoidance hole at a corresponding position of the boss part.

In an embodiment, the main body part is provided with a first penetrating hole, and the insulator is provided with a second penetrating hole at a corresponding position of the first penetrating hole.

In an embodiment, the main body part is provided with a plurality of first recess parts, and the first assembly through hole is provided with a plurality of assembly ports, each of the plurality of assembly ports is corresponding to each of the plurality of the first recess parts.

Another objective of the disclosure is to provide a secondary battery, including the above current collector component, a cell, and a housing.

The cell includes a plurality of first tabs connected to a first current collector piece and a plurality of second tabs connected to a body part of a second current collector piece.

The housing is configured to accommodate the cell, and the housing includes a bottom wall and a side wall extending perpendicular to the bottom wall. A welding part of the second current collector piece is attached and electrically connected to the side wall.

In an embodiment, the secondary battery further includes a cover assembly, the cover assembly including a cover, a seal, and an electrode terminal, the cover being provided with a through hole, the electrode terminal passing through the through hole, the electrode terminal being in insulated connection with the cover through the seal, and the first current collector piece being electrically connected to the electrode terminal.

In an embodiment, the cover is provided with a positioning part.

In an embodiment, the cover assembly or the bottom of the housing is provided with an electrolyte injection hole or an explosion-proof valve.

In an embodiment, the side, far away from the cell, of the insulator is provided with a plurality of second protrusion parts, the seal is provided with a plurality of third recess parts on the side facing the cell, and the plurality of second protrusion parts are correspondingly clamped to the plurality of third recess parts.

In an embodiment, the first current collector piece includes a main body part and a boss part, the main body part being electrically connected to the plurality of first tabs, the boss part extending to the electrode terminal, and the boss part being electrically connected to the electrode terminal.

In an embodiment, the electrode terminal is provided with a second recess part on the side facing the cell, and the boss part is embedded into and welded to the second recess part.

In an embodiment, the plurality of first tabs and the plurality of second tabs are led out from the same end of the cell, and the insulator is provided with a first protrusion part extending to the cell between the plurality of first tabs and the plurality of second tabs.

In an embodiment, the first protrusion part is provided with a third penetrating hole.

In an embodiment, an edge of the first protrusion part is provided with a bayonet.

In an embodiment, the secondary battery is a cylindrical battery.

The disclosure has the beneficial effects that the first current collector piece and the second current collector piece are in insulated connection through the insulator to form a whole, so that the space occupation of the current collector component is reduced, and the space utilization rate and energy density of the battery are effectively improved. At the same time, the second current collector piece includes the body part and the welding part, the body part and the welding part forming an included angle. During the welding of the second current collector piece, the welding part is bent to a certain angle, so that the position of the welding part and the cell form an included angle, and the welding part is tightly attached to the side wall of the housing of the battery for welding, thereby avoiding the cell from being welded through when the existing flat current collector piece and the cover plate perform laser penetration welding, and ensuring the safety of the cell.

BRIEF DESCRIPTION OF THE DRAWINGS

The features, advantages, and technical effects of exemplary implementations of the disclosure will be described below with reference to the accompanying drawings.

ILLUSTRATION OF THE FOLLOWING REFERENCE SIGNS

1. Cell; 11. First tab; 12. Second tab;
2. Housing; 21. Bottom wall; 22. side wall;
3. Cover assembly; 31. Cover; 310. Through hole; 311. Positioning part; 32. Seal; 321. Third recess part; 33. Electrode terminal; 331. Second recess part;
4. Current collector component; 41. First current collector piece; 411. Main body part; 412. Boss part; 413. First penetrating hole; 414. First recess part;
42. Second current collector piece; 421. Body part; 422. Welding part; 423. Notch; and
43. Insulator; 431. Clamping part; 432, First avoidance hole; 433. Second penetrating hole; 434. Assembly port; 435. First protrusion part; 436. Third penetrating hole; 437. Bayonet; 438. Second protrusion part; 43*a*. First assembly through hole; 43*b*. Second assembly through hole; 43*c*. Avoidance area.

DETAILED DESCRIPTION OF THE EMBODIMENTS

Certain terms are used, for example, in the description and claims to refer to particular components. Those skilled in the art should understand that a hardware manufacturer may use different terms to refer to the same component. The specification and claims do not use the difference in name as a way to distinguish components, but use the difference in function of components as a criterion for distinguishing. As mentioned throughout the specification and claims, "comprising" is an open term, so it should be interpreted as "including but not limited to". "Approximately" means that within an acceptable error range, those skilled in the art can solve technical problems within a certain error range and basically achieve technical effects.

In addition, terms "first" and "second" are only used for describing purposes, and cannot be understood as indicating or implying relative importance.

In the disclosure, unless otherwise clearly specified and limited, the terms "installation", "mutual connection", "connection", "fixation" and other terms shall be understood in a broad sense. For example, the term is a fixed connection or a detachable connection, or an integrated connection; the term is a mechanical connection or an electric connection; and the term is a direct connection or an indirect connection through an intermediary, and is communication inside two components. Those of ordinary skill in the art may understand the specific meanings of the terms in the disclosure according to specific conditions.

The disclosure is further described in detail below in combination with the accompanying drawings, but is not limited thereto.

Figure 1:
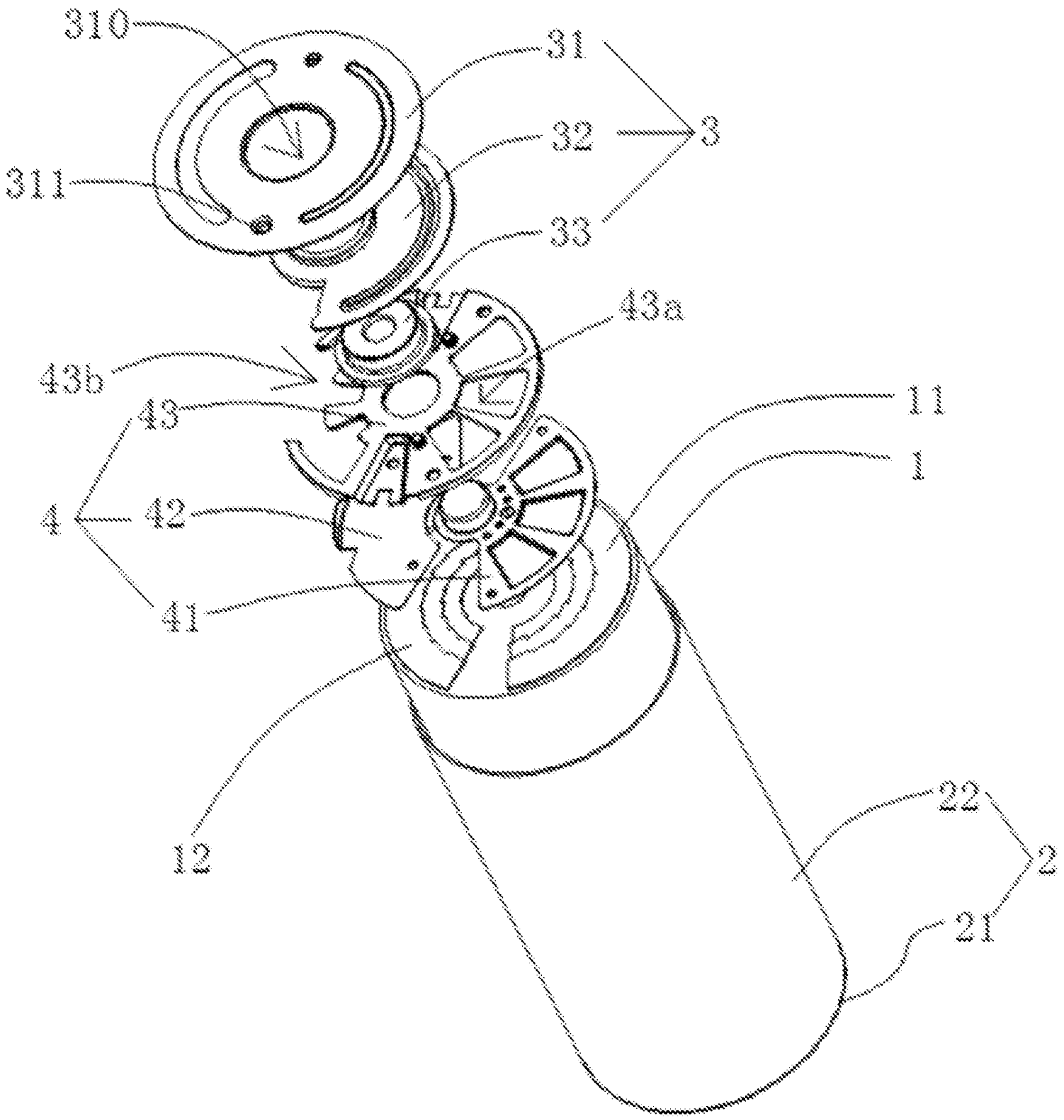
FIG. 1 is a schematic structural diagram of a cylindrical battery according to an embodiment of the disclosure.
Figure 2:
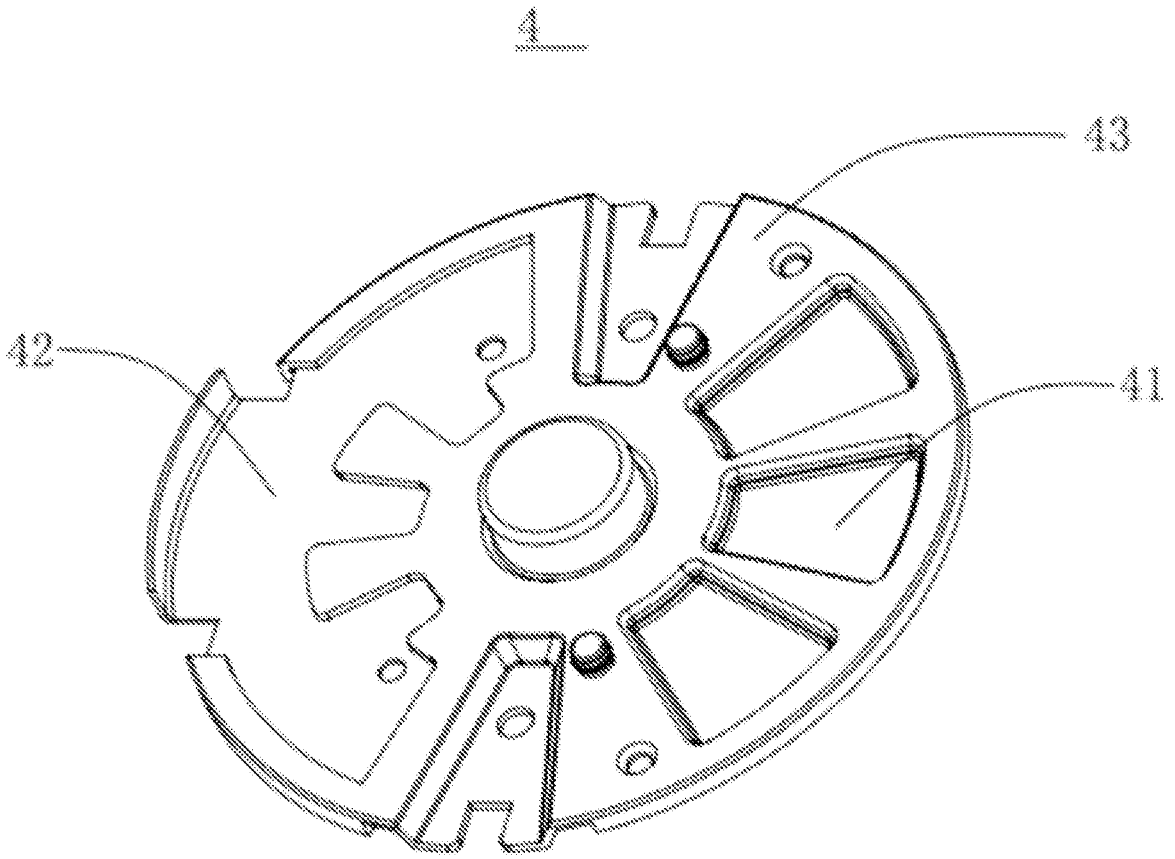
FIG. 2 is a first schematic structural diagram of a current collector component according to an embodiment of the disclosure.
Figure 3:
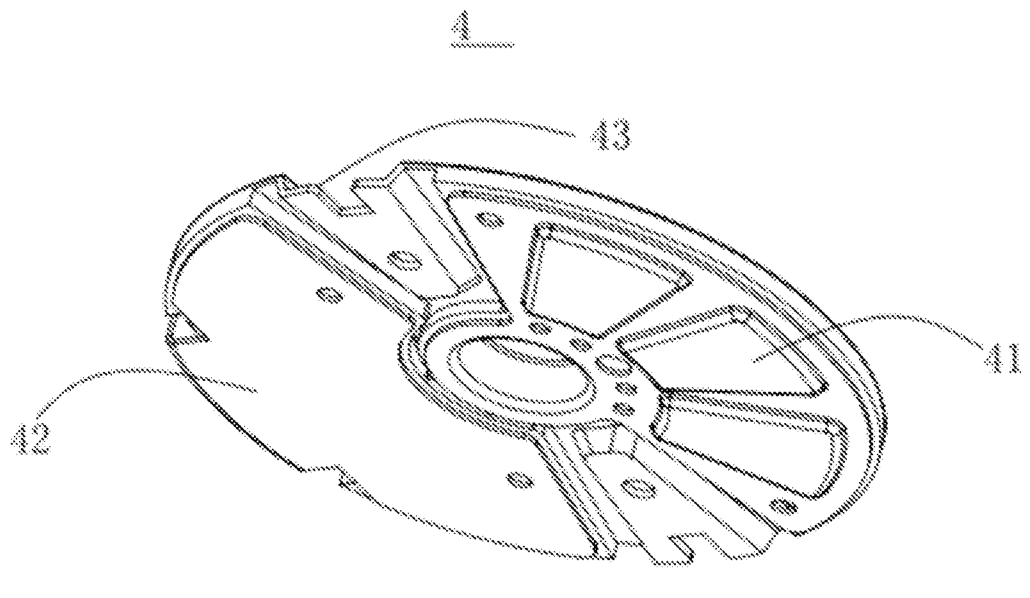
FIG. 3 is a second schematic structural diagram of a current collector component according to an embodiment of the disclosure.
Figure 4:
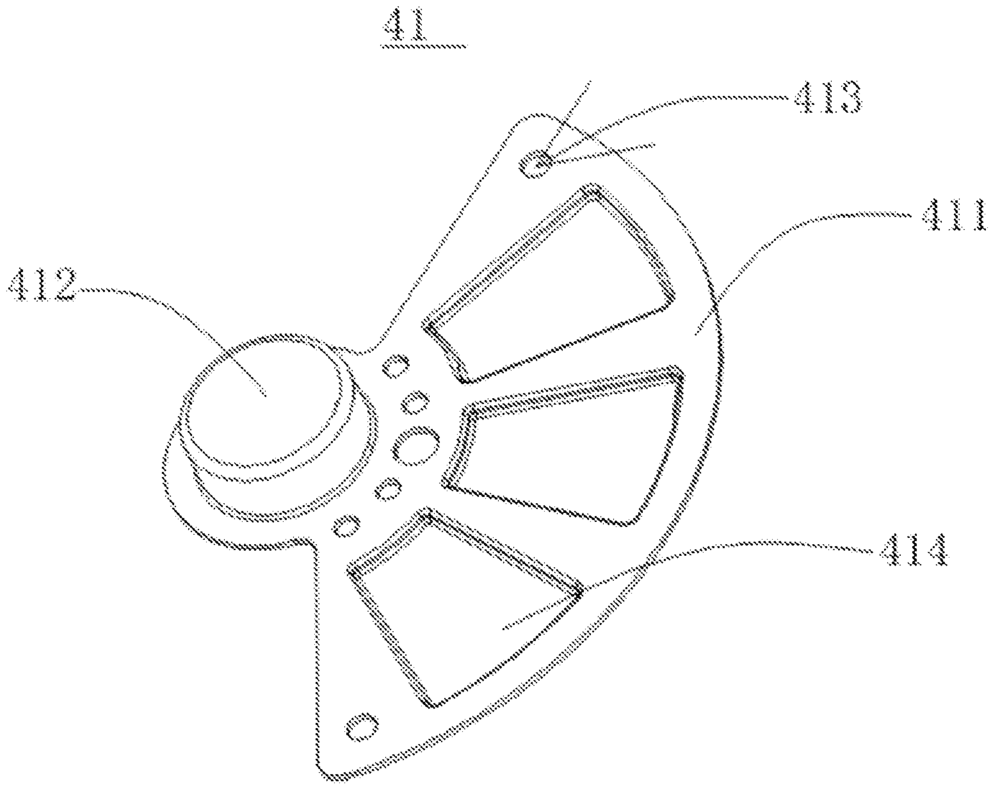
FIG. 4 is a schematic structural diagram of a first current collector piece according to an embodiment of the disclosure.
Figure 5:
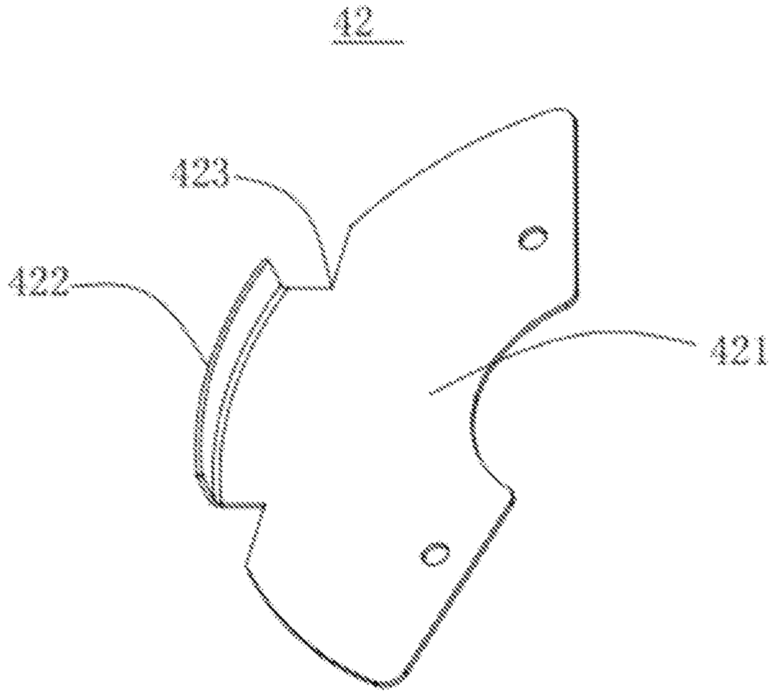
FIG. 5 is a schematic structural diagram of a second current collector piece according to an embodiment of the disclosure.
Figure 6:
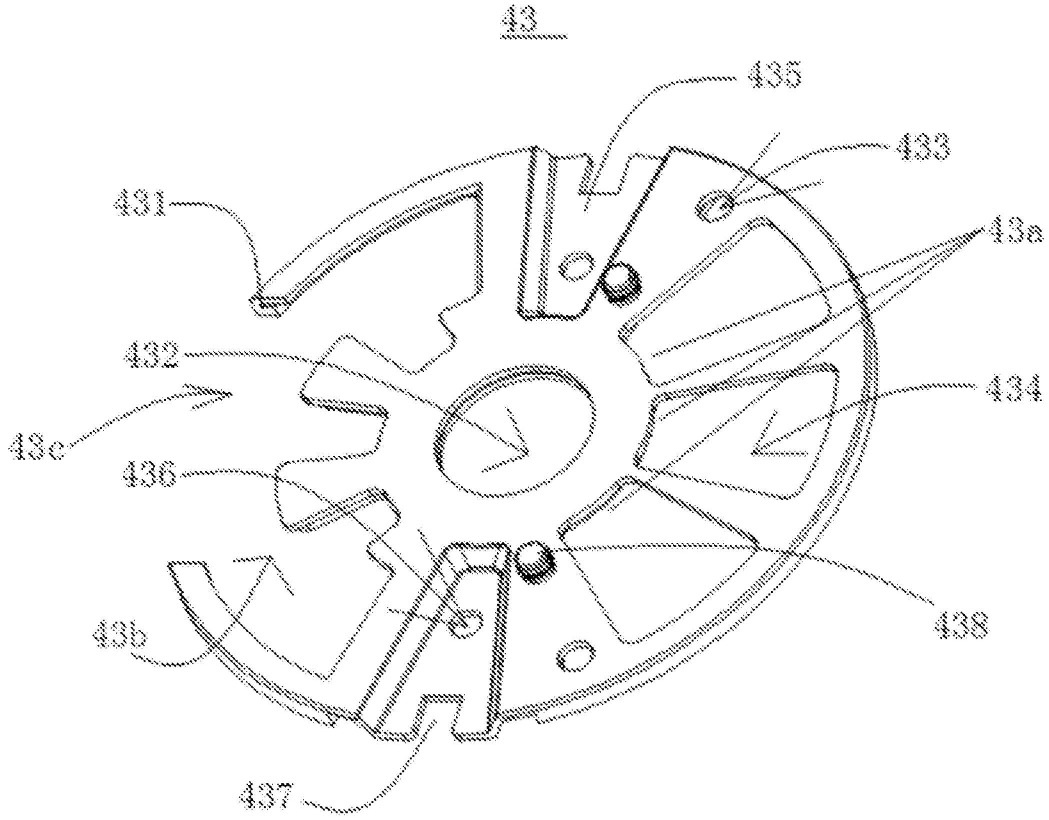
FIG. 6 is a schematic structural diagram of an insulator according to an embodiment of the disclosure.
Figure 7:
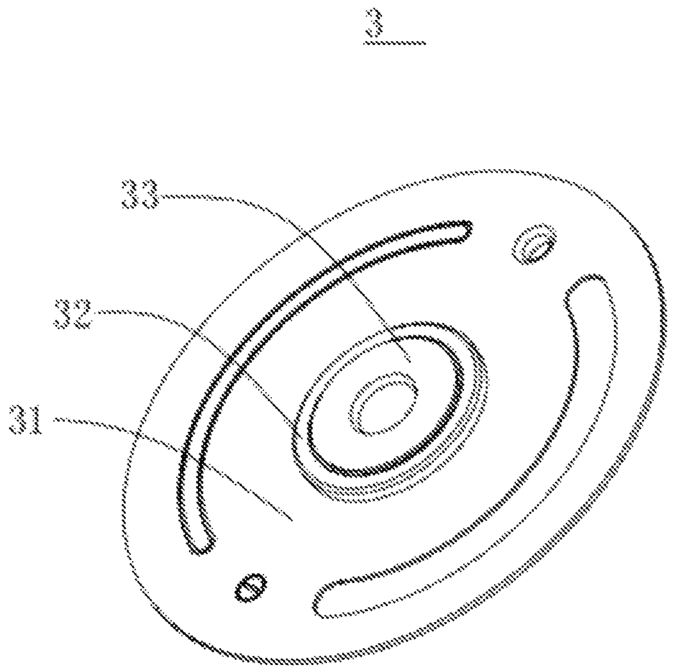
FIG. 7 is a first schematic structural diagram of a cover assembly according to an embodiment of the disclosure.
Figure 8:
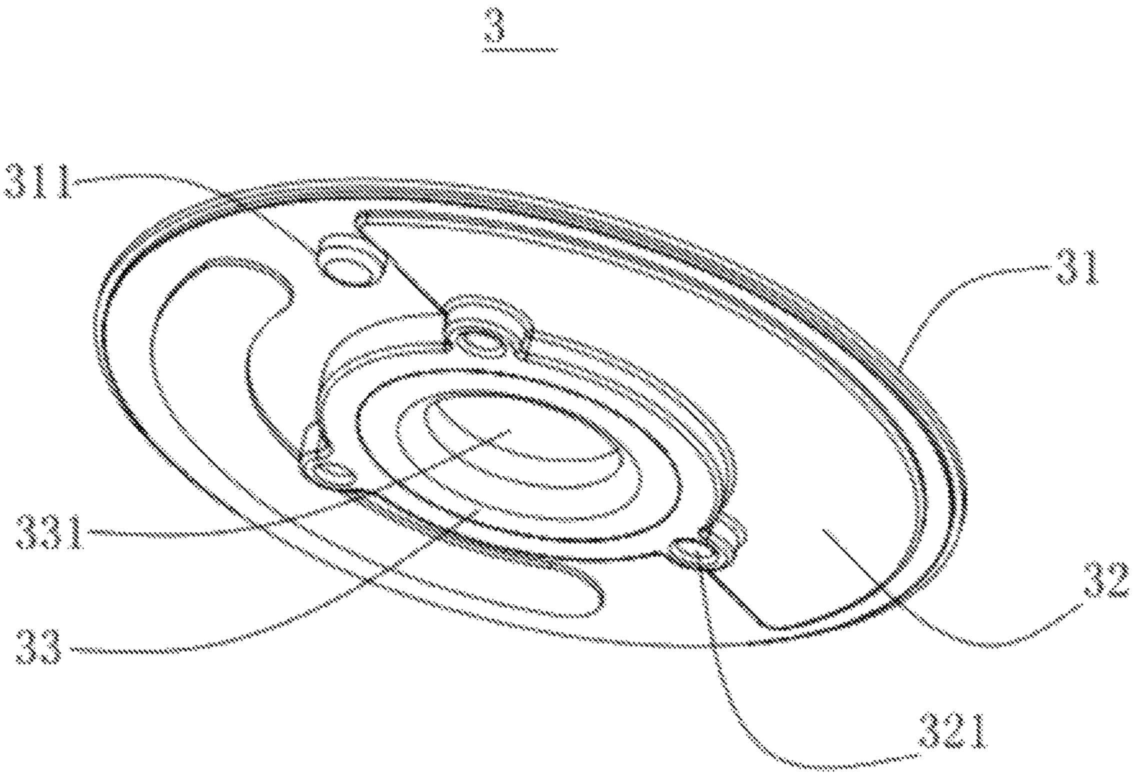
FIG. 8 is a second schematic structural diagram of a cover assembly according to an embodiment of the disclosure.

As shown in FIG. 1 to FIG. 8, embodiments of the disclosure disclose a current collector component, which includes a first current collector piece 41, a second current collector piece 42, and an insulator 43.

The first current collector piece 41 and the second current collector piece 42 are in insulated connection through the insulator 43.

The second current collector piece 42 includes a body part 421 and a welding part 422, the body part 421 and the welding part 421 forming an included angle.

The first current collector piece 43 and the second current collector piece 42 are in insulated connection through the insulator 43 to form a whole, so that the space occupation of the current collector component 4 is reduced, and the space utilization rate and energy density of the battery are effectively improved. At the same time, compared with the existing laser penetration welding on the second current collector piece 42 and a cover 31, the body part 421 and the welding part 422 of the second current collector piece 42 are bent to each other, so that during the welding of the second current collector piece 42, the welding part 422 is bent to a certain angle, the position of the welding part 422 and the cell 1 form an included angle, and the welding part 422 is tightly attached to the side wall of the housing of the battery for welding, thereby avoiding the cell 1 from being welded through when the existing flat current collector piece and the cover plate perform laser penetration welding, and ensuring the safety of the cell 1.

In some embodiments, the body part 421 is provided with a notch 423, there are two notches 423, the two notches 423 is arranged on both sides of the welding part 422, and the notches 423 are arranged at a connection of the body part 421 and the welding part 422.

Because the body part 421 and the welding part 422 of the second current collector piece 42 are formed by bending metal sheets, if the notches 423 are not arranged in the second current collector piece 42, when the second current collector piece 42 is bended, the stress will be concentrated at the corner of the junction of the body part 421 and the welding part 422, which causes the deformation of the second current collector piece 42 at the corner, resulting in the deformation of the body part 421 and the welding part 422. In the above embodiment, in order to avoid the deformation of the second current collector piece 42 from affecting the current passing capability of the second current collector piece 42, and to avoid the deformation of the second current collector piece 42 from affecting the assembly of the second current collector piece 42 and the insulator 43, the body part 421 is provided with the two notches 423, and the two notches 423 are arranged on both sides of the welding part 422, so that when the second current collector piece 42 is bent to form the body part 421 and the welding part 422, the stress is transferred to the notches 423 to avoid the deformation of the second current collector piece 42 therein. In addition, due to the existence of the notches 423, the second current collector piece 42 is more easily bent to form the welding part 422 and the body part 421.

In an embodiment, the welding part 422 is vertically arranged in the body part 421 to ensure that the welding part 422 is tightly attached to the side wall of the housing of the battery.

In some embodiments, the insulator 43 is provided with a clamping part 431, and an edge of the body part 421 is clamped to the clamping part 431.

The insulator 43 is provided with the clamping part 431, so that the edge of the body part 421 is clamped to the clamping part 431, and the connection strength between the insulator 43 and the second current collector piece 42 is enhanced. In an embodiment, surface treatment is performed on the edges of the clamping part 431 of the insulator 43 and the second current collector piece 42, so that the contact surface of the insulator 43 and the second current collector piece 42 is rough, so as to improve the surface energy of the insulator 43 and the second current collector piece 42, and further enhance the connection strength between the insulator 43 and the second current collector piece 42.

In some embodiments, the first current collector piece 41 includes a main body part 411, the insulator 43 is provided with a first assembly through hole 43*a* and a second assembly through hole 43*b*, the main body part 411 is arranged in the first assembly through hole 43*a*, and the body part 421 is arranged in the second assembly through hole 43*b*.

In an embodiment, the insulator 43 is provided with an avoidance area 43*c* at the second assembly through hole 43*b*. The avoidance area 43 avoids the welding part 422.

In some embodiments, the main body part 411 is provided with a plurality of first penetrating holes 413, and the insulator 43 is provided with a plurality of second penetrating holes 433 at a corresponding position of the plurality of first penetrating holes 413.

In order to facilitate infiltration of the cell 1 by an electrolyte, the main body part 411 is provided with the plurality of first penetrating holes 413, and the insulator 43 is provided with the plurality of second penetrating holes 433 at the corresponding position of the plurality of first penetrating holes 413. The plurality of first penetrating holes 413 and the plurality of second penetrating holes 433 are arranged, so that an electrolyte channel is formed on the first current collector piece 41 and the insulator 43, which is convenient for allowing the electrolyte to pass through, thereby reducing the infiltration time of the cell 1, and improving the manufacturing efficiency of the cell 1.

In some embodiments, the main body part 411 is provided with a plurality of first recess parts 414, and the first assembly through hole 43*a* is provided with a plurality of assembly ports 434, each of the plurality of assembly ports is corresponding to each of the plurality of the first recess parts 414, so that the insulator 43 is provided with the plurality of assembly ports 434 at the corresponding position of the plurality of first recess parts 414.

Because the first current collector piece 41 is provided with the plurality of first recess parts 414 extending to the cell 1, when the first current collector piece 41 is welded to a plurality of first tabs 11, the first current collector piece 41 is electrically connected to the plurality of first tabs 11 by performing laser penetration welding on the first recess parts 414, so as to prevent the faulty soldering phenomenon caused by the welding of the plurality of first tabs 11 and the first current collector piece 41. Due to the need for laser penetration welding, the insulator 43 is provided with the plurality of assembly ports 434, so that the plurality of first recess parts 414 are exposed for welding. Because the plurality of first recess part 414*s* are exposed by the plurality of assembly ports 434, in order to prevent the contact between the first current collector piece 41 and the cover 31, the shape of a seal 32 needs to cover the plurality of first recess parts 414, thereby isolating the plurality of first recess parts 414 from the cover 31. It is to be noted that the insulator 43 is provided with the second assembly through hole 43*b* at the position of the second current collector piece 42, so that the second current collector piece 42 and a plurality of second tabs 12 perform penetration welding.

A secondary battery includes a cell 1, a housing 2, a cover assembly 3, and a current collector component 4. A plurality of first tabs 11 and a plurality of second tabs 12 are led out from the same end of the cell 1. The housing 2 is configured to accommodate the cell 1, and the housing 2 includes a bottom wall 21 and a side wall 22 extending perpendicular to the bottom wall 21. The cover assembly 3 includes a cover 31, a seal 32, and an electrode terminal 33, the cover 31 being provided with a through hole 310, the electrode terminal 33 passing through the through hole 310, and the electrode terminal 33 being in insulated connection with the cover 31 through the seal 32. The current collector member 4 includes a first current collector piece 41, a second current collector piece 42, and an insulator 43. The first current collector piece 41 and the second current collector piece 42 are in insulated connection through an insulator 43. The first current collector piece 41 is configured to electrically connect the electrode terminal 33 to the plurality of first tabs 11. The second current collector piece 42 includes a body part 421 and a welding part 422. The welding part 422 is vertically arranged in the body part 421, the body part 421 is electrically connected to the plurality of second tabs 12, and the welding part 422 is electrically connected to the side wall 22. The secondary battery is a cylindrical battery.

The cell 1 is a component for an electrochemical reaction in the battery. The plurality of first tabs 11 and the plurality of second tabs 12 are led out from the cell 1, the plurality of first tabs 11 and the plurality of second tabs 12 protrude from the end of the cell 1. Of course, in the disclosure, the plurality of first tabs 11 and the plurality of second tabs 12 are located at the same end of the cell 1. The cell 1 includes a positive electrode plate, a negative electrode plate, and a separator. The cell 1 is of a winding structure formed by winding the positive electrode plate, the separator, and the negative electrode plate. The cell 1 is of a laminated structure formed by a laminated arrangement of the positive electrode plate, the separator, and the negative electrode plate. After the cell 1 is wound to the winding structure having positive and negative electrodes led out from the same end, positive and negative tabs are flattened or kneaded to increase the contact area of the positive and negative tabs and the external electrical connection, so as to increase the current passing area.

The positive electrode plate includes a positive current collector and a positive active material layer coated on two opposite sides of the positive current collector. The negative electrode plate includes a negative current collector and a negative active material layer coated on two opposite sides of the negative current collector. The cell 1 is a part corresponding to an area, coated with the active material layer, of the electrode plate, the positive tabs are a part, not coated with the positive active material layer, of the positive electrode plate, and the negative tabs are a part, not coated with the negative active material layer, of the negative electrode plate. Taking a lithium-ion battery as an example, the material of the positive current collector is aluminum, and a positive active material is lithium cobaltate, lithium iron phosphate, ternary lithium or lithium manganate, etc. The material of the negative current collector is copper, and the negative active material is carbon, or silicon, etc. In order to ensure that no fusing occurs through a large current, the number of positive tabs is multiple, and the number of negative tabs is multiple. One of the plurality of first tabs 11 and the plurality of second tabs 12 is the positive tabs and the other is the negative tab. The material of the separator is polypropylene (PP) or polyethylene (PE).

The housing 2 is a component configured to accommodate the cell 1. The housing 2 includes the bottom wall 21 and the side wall 22 extending perpendicular to bottom wall 21, the bottom wall 21 and the side wall 22 forming a hollow structure with one end opening. The housing 2 is integrally formed by the bottom wall 21 and the side wall 22 or welded by the bottom wall 21 and the side wall 22. The housing 2 is made of a variety of materials, such as copper, iron, aluminum, steel, aluminum alloy, etc. The shape of the housing 2 is a cylinder. Exemplarily, the diameter of the housing 2 is 20 mm-80 mm.

The cover assembly 3 is a component that covers the opening of the housing 2 to isolate the internal environment of the battery from the external environment. The cover assembly 3 covers the opening of the housing 2, and the cover assembly 3 and the housing 2 together define a sealed space configured to accommodate the cell 1, the electrolyte, and other components. After the cover assembly 3 covers the housing 2, the height of the cylindrical battery is 60 mm to 300 mm. The cover assembly 3 includes the cover 31, the seal 32, and the electrode terminal 33, and the projection shape of the cover 31 is adapted to the projection shape of the housing 2, for example, the housing 2 is of a cylindrical structure, and the cover 31 is a round plat-like structure adapted to the housing 2. The cover 31 is made of a variety of materials, such as copper, iron, aluminum, steel, aluminum alloy, etc. The cover 31 is provided with the through hole 310, the electrode terminal 33 passes through the through hole 310, and the electrode terminal 33 is fixed to the cover 31 in an insulating manner through the seal 32. The electrode terminal 33 is of a convex structure in the embodiment, the electrode terminal 33 is made of a conductive metal material, such as aluminum, etc., and the seal 32 is made of an insulating material, such as rubber, etc. At the same time, in order to enhance the connection strength between the cover 31 and the housing 2 and speed up the welding efficiency, an opening of the housing 2 is provided with a step structure, or the cover 31 is provided with a step structure, so that the housing 2 and the cover 31 are aligned faster in the welding process, and the connection effect between the cover 31 and the housing 2 is better through the arrangement of the step structure.

The current collector component 4 is arranged between the cell 1 and the cover assembly 3, and the current collector component 4 includes the first current collector piece 41, the second current collector piece 42, and the insulator 43. The first current collector piece 41 and the second current collector piece 42 are in insulated connection through the insulator 43. The first current collector piece 41 is configured to electrically connect the electrode terminal 33 to the plurality of first tabs 11. The second current collector piece 42 includes the body part 421 and the welding part 422. The welding part 422 is vertically arranged in the body part 421, the body part 421 is electrically connected to the plurality of second tabs 12, and the welding part 422 is attached and electrically connected to the side wall 22. The first current collector piece 41 is connected to the second current collector piece 42 through the insulator 43 to form the current collector component 4, only the current collector component 4, as a whole, needs to be clamped during the mounting process, the first current collector piece 41 and the second current collector piece 42 are placed at one end of the cell 1 to be welded to the positive and negative tabs of the cell 1. Therefore, for the separate first current collector piece 41 and the second current collector piece 42, the number of times of picking up is reduced to speed up the assembly speed, at the same time, because the positive and negative tabs are led out from the same end, and the first current collector piece 41 and the second current collector piece 42 are also located in the same plane, the insulator 43 may well insulate the first current collector piece 41 from the second current collector piece 42 to prevent a direct contact between the first current collector piece 41 and the second current collector piece 42 from causing a short circuit to the cylindrical battery. The insulator 43 also makes the first current collector piece 41 and the second current collector piece 42 have a certain distance from the cover assembly 3, so as to prevent the contact between the first current collector piece 41 and the cover plate 31 from causing a short circuit. Optionally, the length of the welding part 422 is 2 to 5 mm.

In the embodiment, the plurality of first tabs 11 and the plurality of second tabs 12 are led out from the cell 1 at the same end, the first current collector piece 41 and the second current collector piece 42 are in insulated connection through the insulator 43 to form a whole, and the electrode terminal 33 and the cover 31 are in insulated connection through the seal 32, so that the first current collector piece 41 is electrically connect the plurality of first tabs 11 to the electrode terminal 1, and the second current collector piece 42 is electrically connect the plurality of second tabs 12 to the cover 31. Because the positive and negative tabs are led out from the same end, and the first current collector piece 41 and the second current collector piece 42 are also located on the same end, the space occupation of the current collector pieces and the tabs is reduced, and the space utilization rate and energy density of the battery are effectively improved. At the same time, compared with the existing laser penetration welding on the second current collector piece 42 and the cover 31, because the cover 31 and the second current collector piece 42 are small in thickness, and the cell 1 is located below the second current collector piece 42, the laser is prone to cause the damage to the cell 1 when performing penetration welding on the cover 31 and the second current collector piece 42 using the laser. Therefore, the second current collector piece 42 in the disclosure includes the body part 421 and the welding part 422, through the welding part 422 vertically arranged on the body part 421, the body part 421 is electrically connected to the plurality of second tabs 12, and the welding part 422 is attached and electrically connected to the side wall 22, so that the laser penetrates through the side wall 22 and the welding part 422 for welding. Because the welding part 422 is perpendicular to the body part 421, even if the laser penetrates through the side wall 22, the cell 1 is not affected, thereby ensuring the safety of the cell 1.

In some embodiments, the cover assembly 3 or the bottom of the housing 2 is provided with an electrolyte injection hole or an explosion-proof valve. The cylindrical battery is inject the electrolyte into the cylindrical battery through the electrolyte injection hole, and after the electrolyte injection is completed, the electrolyte injection hole is sealed using a metal sheet. When the cylindrical battery has thermal runaway, the internal gas is discharged through the explosion-proof valve in time, so as to complete the pressure relief, thereby ensuring the use safety of the cylindrical battery.

In some embodiments, the first current collector piece 41 further includes a boss part 412, the insulator 43 being provided with a first avoidance hole 432 at a corresponding position of the boss part 412.

Because the first current collector piece 41 is connected to the second current collector piece 42 through the insulator 43, and there is a certain distance between the first current collector piece 41 and the cover assembly 3, in the embodiment, the first current collector piece 41 is provided with the boss part 412 extending to the electrode terminal 33, so that the first current collector piece 41 and the electrode terminal 33 are in contact and welded. At the same time, the main body part 411 and the plurality of first tabs 11 are in contact and welded, so that the plurality of first tabs 11 of the cell 1 is electrically connected to the electrode terminal 33 through the first current collector piece 41. Because the boss part 412 needs to be in contact with the electrode terminal 33, the insulator 43 is provided with the first avoidance hole 432 at the corresponding position, so that the boss part 412 passes through the first avoidance hole 432, thereby completing the contact between the boss part 412 and the electrode terminal 33. In an embodiment, the through hole 310 of the cover 31 is arranged in the center position, so that the electrode terminal 33 is also located in the center position of the cover 31. Therefore, the boss part 412 of the first current collector piece 41 needs to be arranged accordingly, so that the boss part 412 and the electrode terminal 33 are located in the same axis.

In some embodiments, the electrode terminal 33 is provided with a second recess part 331 on the side facing the cell 1, and the boss part 412 is embedded into the second recess part 331 and welded.

When the electrode terminal 33 is not provided with the second recess part 331, the contact surface between the boss part 412 and the electrode terminal 33 is only a top surface of the boss part 412. In the embodiment, the electrode terminal 33 is provided with the second recess part 331 on the side facing the cell 1 of the electrode terminal 33, and after the boss part 412 is embedded into the second recess part 331, the contact surface of the boss part 412 and the electrode terminal 33 includes the top surface of the boss part 412 and a side surface of the boss part 412, which increases the welding area of the boss part 412 and the electrode terminal 33, thereby improving the current passing area of the first current collector piece 41, and improving the current passing capability of the cylindrical battery.

In some embodiments, the insulator 43 is provided with first protrusion parts 435 extending to the cell 1 between the plurality of first tabs 11 and the plurality of second tabs 12.

Because the cylindrical battery shakes during use, in order to ensure that the positions of the current collector component 4 and the cell 1 remain relatively stationary, the insulator 43 is provided with the first protrusion parts 435 extending to the cell 1 between the plurality of first tabs 11 and the plurality of second tabs 12. Because the first protrusion part 434 is clamped between the plurality of first tabs 11 and the plurality of second tabs 12 to play a good limiting role, relative displacement of the cell 1 and the current collector component 4 in a vertical direction is prevented, and at the same time avoiding relying on the welding structure to play a fixing role, thereby ensuring the welding quality and prolonging the service life. Two first protrusion parts 435 are symmetrically arranged about the first avoidance hole 432.

In some embodiments, the insulator 43 is provided with a third penetrating hole 436 in each of the first protrusion parts 435. The insulator 43 is provided with the third penetrating hole 436 in each of the first protrusion parts 435, so that the third penetrating hole 436 forms an electrolyte channel, which is convenient for the electrolyte to infiltrate the cell 1 after passing through the insulator 43, thereby improving the injection efficiency of the cell 1.

In some embodiments, an edge of the first protrusion part 435 is provided with a bayonet 437.

In the process of transferring the current collector component 4 to the cell 1, because the current collector component 4 is a whole, the first current collector piece 41 needs to correspond to the plurality of first tabs 11, and the second current collector piece 42 corresponds to the plurality of second tabs 12, so that the current collector component 4 is aligned with the cell 1 according to a preset position through the bayonet 437 arranged on the edge of the first protrusion part 435, thereby ensuring that the first current collector piece 41 and the plurality of first tabs 11 are in contact correspondingly, and the second current collector piece 42 and the plurality of second tabs 12 are in contact correspondingly.

In some embodiments, the cover 31 is provided with a positioning part 311. The positioning part 311 is convex facing the cell 1, and the positioning part 311 is concave on the side far away from the cell 1. The positioning part 311 is convex and concave to be matched with a clamp, so as to fix the cover 31 during the injection molding process of the insulator 43, so as to avoid the cover 31 from shaking.

In some embodiments, the side, far away from the cell 1, of the insulator 43 is provided with a plurality of second protrusion parts 438, the seal 32 is provided with a plurality of third recess parts 321 on the side facing the cell 1, and the plurality of second protrusion parts 438 are correspondingly clamped to the plurality of third recess parts 321.

The current collector component 4 is respectively electrically connected to the cell 1 and the cover assembly 3. After the cover assembly 3 covers the housing 2, the assembly situation of the inside of the cylindrical battery cannot be seen, and then it is impossible to know whether the seal 32 covers the first current collector piece 41, so that the side, far away from the cell 1, of the insulator 43 is provided with the plurality of second protrusion parts 438, and the seal 32 is provided with the plurality of third recess parts 321 on the side facing the cell 1. The plurality of second protrusion parts 438 are correspondingly clamped to the plurality of third recess parts 321, so that it is determined whether the mounting positions of the cover assembly 3 and the current collector component 4 are the same as the preset mounting positions.

According to the disclosure and teaching of the above specification, those skilled in the art to which the disclosure pertains can also change and modify the above implementations. Therefore, the disclosure is not limited to the above specific implementations, and any obvious improvement, substitution or modification made by those skilled in the art on the basis of the disclosure shall fall within the scope of protection of the disclosure. In addition, although some specific terms are used in the specification, these terms are only for convenience of description and do not constitute any limitation to the disclosure.

What is claimed is:

1. A current collector component, comprising:

a first current collector piece, a second current collector piece, and an insulator, the first current collector piece and the second current collector piece being in insulated connection through the insulator; and the second current collector piece comprises a body part and a welding part, the body part and the welding part forming an included angle, the first current collector piece comprises a main body part, the insulator being provided with a first assembly through hole and a second assembly through hole, the main body part being arranged in the first assembly through hole, and the body part being arranged in the second assembly through hole, the main body part is provided with a plurality of first recess parts, and the first assembly through hole is provided with a plurality of assembly ports, each of the plurality of assembly ports corresponds with an individual, respective first recess part of the plurality of the first recess parts.

2. The current collector component according to claim 1, wherein a connection of the body part and the welding part is provided with a notch.

3. The current collector component according to claim 1, wherein the welding part is vertically arranged on the body part.

4. The current collector component according to claim 1, wherein the insulator is provided with a clamping part, and an edge of the body part is clamped to the clamping part.

5. The current collector component according to claim 1, wherein the insulator is provided with an avoidance area at the second assembly through hole to avoid the welding part.

6. The current collector component according to claim 1, wherein the first current collector piece further comprises a boss part, the insulator being provided with a first avoidance hole at a corresponding position of the boss part.

7. The current collector component according to claim 1, wherein the main body part is provided with a first penetrating hole, and the insulator is provided with a second penetrating hole at a corresponding position of the first penetrating hole.

8. A secondary battery, comprising the current collector component according to claim 1;

a cell, comprising a plurality of first tabs connected to the first current collector piece and a plurality of second tabs connected to the body part of the second current collector piece; and a housing, configured to accommodate the cell, the housing comprising a bottom wall and a side wall extending perpendicular to the bottom wall, and a welding part of the second current collector piece being attached and electrically connected to the side wall.

9. The secondary battery according to claim 8, further comprising a cover assembly, the cover assembly comprising a cover, a seal, and an electrode terminal, the cover being provided with a through hole, the electrode terminal passing through the through hole, the electrode terminal being in insulated connection with the cover through the seal, and the first current collector piece being electrically connected to the electrode terminal.

10. The secondary battery according to claim 9, wherein the cover is provided with a positioning part.

11. The secondary battery according to claim 9, wherein the cover assembly or the bottom of the housing is provided with an electrolyte injection hole or an explosion-proof valve.

12. The secondary battery according to claim 9, wherein a plurality of second protrusion parts are provided on a side of the insulator opposite to the cell, the seal is provided with a plurality of third recess parts on the side facing the cell, and the plurality of second protrusion parts are correspondingly clamped to the plurality of third recess parts.

13. The secondary battery according to claim 9, wherein the first current collector piece comprises a boss part, the main body part being electrically connected to the plurality of first tabs, the boss part extending to the electrode terminal, and the boss part being electrically connected to the electrode terminal.

14. The secondary battery according to claim 13, wherein the electrode terminal is provided with a second recess part on the side facing the cell, and the boss part is embedded into and welded to the second recess part.

15. The secondary battery according to claim 8, wherein the plurality of first tabs and the plurality of second tabs are led out from the same end of the cell, and the insulator is provided with a first protrusion part extending to the cell between the plurality of first tabs and the plurality of second tabs.

16. The secondary battery according to claim 15, wherein the first protrusion part is provided with a third penetrating hole.

17. The secondary battery according to claim 15, wherein an edge of the first protrusion part is provided with a bayonet.

18. The secondary battery according to claim 12, wherein the plurality of first tabs and the plurality of second tabs are led out from the same end of the cell, and the insulator is provided with a first protrusion part extending to the cell between the plurality of first tabs and the plurality of second tabs.

* * * * *